United States Patent
Dupey et al.

(10) Patent No.: US 11,200,285 B2
(45) Date of Patent: Dec. 14, 2021

(54) GEOCODING ADMINISTRATIVE AREAS WITH USER-DEFINED CONTENT

(71) Applicant: SAP SE, Walldorf (DE)

(72) Inventors: Ronald Dupey, Onalaska, WI (US); Timothy Parker, Loyal, WI (US)

(73) Assignee: SAP SE, Walldorf (DE)

( * ) Notice: Subject to any disclaimer, the term of this patent is extended or adjusted under 35 U.S.C. 154(b) by 358 days.

(21) Appl. No.: 16/381,370

(22) Filed: Apr. 11, 2019

(65) Prior Publication Data

US 2020/0327164 A1  Oct. 15, 2020

(51) Int. Cl.
G06F 16/00 (2019.01)
G06F 16/909 (2019.01)
G06F 16/9032 (2019.01)
G06F 16/903 (2019.01)

(52) U.S. Cl.
CPC ........ *G06F 16/909* (2019.01); *G06F 16/9032* (2019.01); *G06F 16/90335* (2019.01)

(58) Field of Classification Search
CPC .............. G06F 16/909; G06F 16/9032; G06F 16/90335
See application file for complete search history.

(56) References Cited

U.S. PATENT DOCUMENTS

| | | | |
|---|---|---|---|
| 10,762,046 B2 * | 9/2020 | Dupey | G06F 16/215 |
| 10,922,320 B2 * | 2/2021 | Dupey | G06F 16/24575 |
| 2004/0023666 A1 * | 2/2004 | Moon | H04L 67/16 455/456.1 |
| 2005/0262194 A1 * | 11/2005 | Mamou | G06Q 10/10 709/203 |
| 2008/0177464 A1 * | 7/2008 | Fuchs | G06F 16/29 701/533 |
| 2015/0058233 A1 * | 2/2015 | Budlong | G06Q 50/16 705/315 |
| 2017/0131106 A1 * | 5/2017 | Dupey | G01C 21/32 |
| 2019/0066241 A1 * | 2/2019 | Budlong | G06Q 50/165 |

* cited by examiner

*Primary Examiner* — Shiow-Jy Fan
(74) *Attorney, Agent, or Firm* — Sterne, Kessler, Goldstein & Fox P.L.L.C.

(57) ABSTRACT

Disclosed herein are system, method, and computer program product embodiments for getting location-based data for a specific location or area. An embodiment transmits a request for a first location item at a first administrative level of a first location hierarchy to a data provider for a location. The embodiment receives the first location item. The embodiment determines a second administrative level is present in the first location hierarchy for the location. The embodiment transmits a second request for a second location item at the second administrative level to the data provider for the location. The embodiment receives the second location item. The embodiment maps the first location item and the second location item respectively to a first administrative level and a second administrative level in the second location hierarchy. The embodiment then creates a result set for the location based on the first location item and the second location item.

21 Claims, 7 Drawing Sheets

| Level | Component Type | Name | Code | Geo-coordinates |
|---|---|---|---|---|
|  | Country | United States |  | 38.89206/-77.01991 |
| 1 | Region 1 | California | 1779778 | 37.26918/-119.30661 |
| 2 | Region 2 | Los Angeles | 277283 | 34.05224/-118.24334 |
| 3 | Locality 1 | Los Angeles | 2410877 | 34.05224/-118.24334 |
|  | Locality 2 | Hollywood |  | 34.09799/-118.32951 |
|  | Postcode | 90028 |  | 34.10071/-118.32813 |

| GUID | Name | Code | Geo-coordinates |
|---|---|---|---|
| 301 | Western Region | West | 37.768910/-122.415538 ~302 |
| 302 | Central Region | Central | 39.056198/-95.695312 |
| 303 | Eastern Region | Eastern | 37.27783/-79.958472 |

FIG. 3A

| Sales Region GUID | Location Item GUID |
|---|---|
| 301 | 330 |
| 301 | 332 |
| 302 | 340 |

| Level | Component Type | Name | Code | Geo-coordinates |
|---|---|---|---|---|
|  | Country | United States |  | 38.89206/-77.01991 ~306 |
|  | Sales Region | Western Region | West | 37.768910/-122.415538 |
| 1 | Region 1 | California | 1779778 | 37.26918/-119030661 |
| 2 | Region 2 | Los Angeles | 277283 | 34.05224/-118.24334 |
| 3 | Locality 1 | Los Angeles | 2410877 | 34.05224/-118.24334 |
|  | Locality 2 | Hollywood |  | 34.09799/-118.32951 |
|  | Postcode | 90028 |  | 34.10071/-118.32813 |

| GUID | Name | Code | Geo-coordinates |
|---|---|---|---|
| 401 | Los Angeles International Airport | LAX | 33.943414/-118.409946 |

| Level | Component Type | Name | Code | Geo-coordinates |
|---|---|---|---|---|
| | Country | United States | | 38.89206/-77.01991 |
| 1 | Region 1 | California | 1779778 | 37.26918/-119.30661 |
| 2 | Region 2 | Los Angeles | 277283 | 34.05224/-118.24334 |
| 3 | Locality 1 | Los Angeles | 2410877 | 34.05224/-118.24334 |
| | Locality 2 | Hollywood | | 34.09799/-118.32951 |
| | Postcode | 90028 | | 34.10071/-118.32813 |
| | Airport | Los Angeles International Airport | LAX | 33.3943414/-118.409946 |

FIG. 4B

| Location Item GUID | Time Zone Value |
|---|---|
| 501 | Pacific |

FIG. 5A ~502

| Level | Component Type | Name | Code | Geo-coordinates | Time Zone |
|---|---|---|---|---|---|
|  | Country | United States |  | 38.89206/-77.01991 |  |
| 1 | Region 1 | California | 1779778 | 37.26918/-119.30661 |  |
| 2 | Region 2 | Los Angeles | 277283 | 34.05224/-118.24334 |  |
| 3 | Locality 1 | Los Angeles | 2410877 | 34.05224/-118.24334 | Pacific |
|  | Locality 2 | Hollywood |  | 34.09799/-118.32951 |  |

GEOCODING ADMINISTRATIVE AREAS WITH USER-DEFINED CONTENT

BACKGROUND

An entity often wants to get location-based data for a specific location. For example, a business may want to get administrative level names and other location-based data for a specific geo-location. Traditionally, an entity may need to submit multiple requests to a data provider to get location-based data. This is because the entity may need to parse a response from the data provider to request the remaining location-based data from the data provider. But this process is computationally intense. This is because there is no way for the entity to get all the relevant location-based data for a specific location in response to a single request.

Moreover, this process is error prone because the entity often does not know how to process the location-based data. This is because the location-based data can be stored in different data formats depending on the particular data provider and the locale associated with the requested location. This is also because the location-based data can be stored according to a different location hierarchy depending on the particular data provider and the locale associated with the requested location.

Finally, this process is often inflexible because there is no way for the entity to define their own location areas, points, or properties based on the reference location data at a data provider. Moreover, there is no way for the entity to automatically integrate their own defined locations areas, points, or properties with the reference location data at the data provider.

BRIEF DESCRIPTION OF THE DRAWINGS

The accompanying drawings are incorporated herein and form a part of the specification.

FIG. 3A is an example illustrating how a custom location component type for an area can be defined, according to some embodiments.

FIG. 3B is an example illustrating how to integrate a custom location component type into a result set, according to some embodiments.

FIG. 3C is an example illustrating a result set produced by a location engine based on a custom location component type, according to some embodiments.

FIG. 4A is an example illustrating how a custom location component type for a location point can be defined, according to some embodiments.

FIG. 4B is an example illustrating a result set produced by a location engine based on a custom location component type for a location point, according to some embodiments.

FIG. 5A is an example illustrating how a custom property can be defined, according to some embodiments.

FIG. 5B is an example illustrating a result set produced by a location engine using a custom property, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
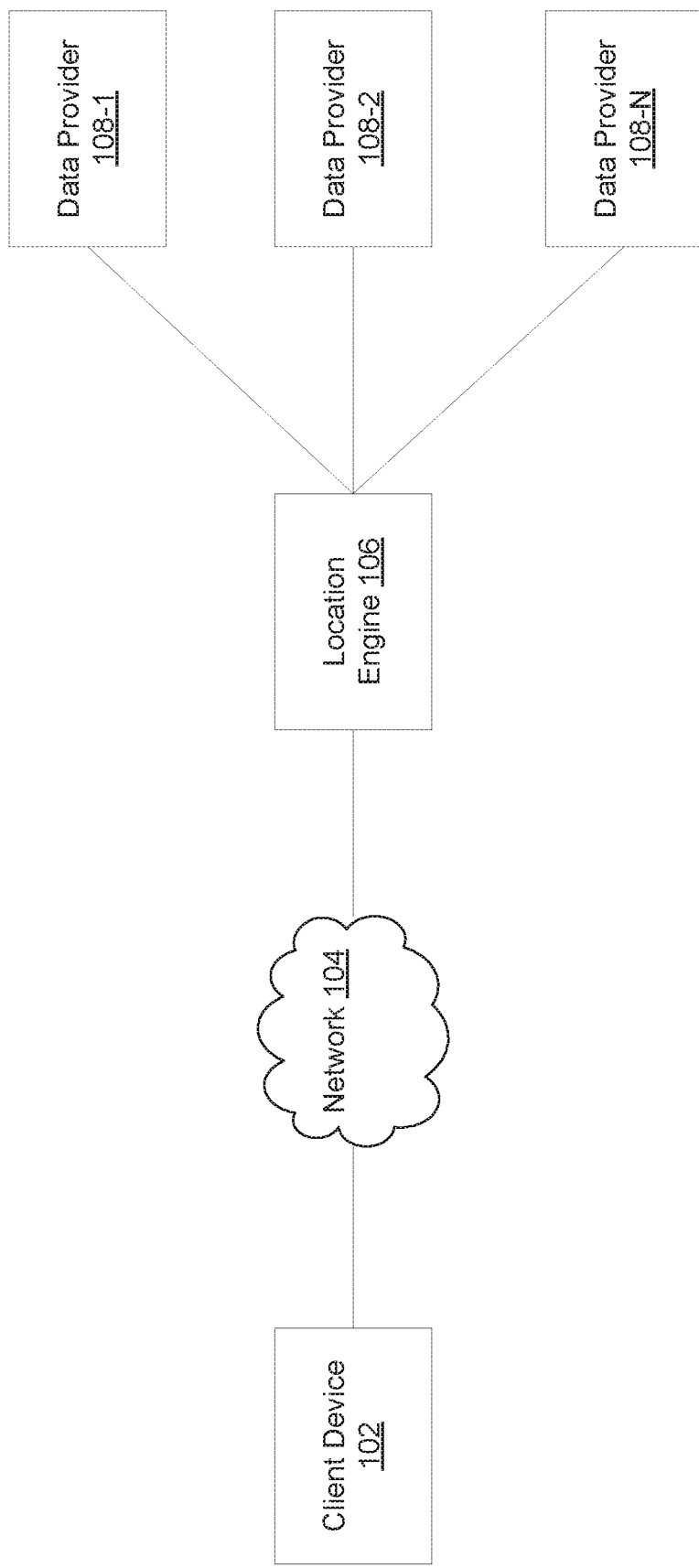
FIG. 1 is a block diagram of a system for getting location-based data for a specific location or area, according to some embodiments.

Provided herein are system, apparatus, device, method and/or computer program product embodiments, and/or combinations and sub-combinations thereof, for retrieving relevant location-based data for a specific geo-location in response to a single request. Moreover, provided herein are system, apparatus, device, method and/or computer program product embodiments, and/or combinations and sub-combinations thereof, for defining location areas, points, or properties based on reference location data from a data provider and automatically integrating these defined location areas, points, and properties with the reference location data returned from the data provider.

An entity often wants to obtain location-based data for a specific location. A data provider can store reference location data for use by different entities. This reference data can be stored as location items of various location component types.

For example, a location item can describe a particular administrative level (or administrative area or administrative division). An administrative level can represent a division of a geographic area. An administrative level can include sub administrative levels. As a result, an administrative level can have a particular place in a location hierarchy.

Governing authorities can divide an area into multiple administrative levels for their own administrative purposes. For example, governing authorities can divide a country into states, states into counties, counties into municipalities, and municipalities into sub-municipalities.

Within the location hierarchy of a country, divisions at the higher levels of the hierarchy can be static, but then may vary at lower levels of the hierarchy. The number of administrative levels can vary at different locations in a country. For example, highly populated urban areas may have more levels in the location hierarchy than sparsely populated rural areas.

In addition, administrative levels at the same level of the location hierarchy can have different names at different locations. For example, the United States state of Texas is divided into counties, and the state of Louisiana is divided into parishes. However, both counties and parishes can be at the same level in the location hierarchy.

In addition, there can exist administrative levels that are commonly used by the residents of an area but are not officially defined by the governing authorities. For example, the municipality of Los Angeles is divided into neighborhoods such as Hollywood and Beverly Hills. But these neighborhoods are not official administrative levels defined by governing authorities. Similarly, the municipality of New York is divided into the five boroughs of Manhattan, Brooklyn, Queens, The Bronx, and Staten Island which are official administrative levels. But each of these boroughs are divided into neighborhoods that are not official administrative levels.

Finally, it is often the case for some administrative levels to be included in the definition of a delivery address, but not all. For example, countries in the Americas and Europe typically have a first-level administrative level of region, and each region is divided into a second-level administrative level of district. Many countries in Europe do not include the region when providing a delivery address. In contrast, many countries in the Americas do include the region. The opposite is also true. It is often the case for some address attributes to be included in the location hierarchy of administrative levels, but not all. For example, a country can include a postal code for a delivery address even though the postal code is not an administrative level in the location hierarchy.

Conventional approaches for getting location-based data for a specific location involve querying a data provider. The data provider can then perform the individual functions of getting administrative levels, geocoding, and reverse geocoding for the requested location.

For example, conventional approaches can involve providing a geolocation to a data provider and receiving a delivery address for that location. Conventional approaches can also involve providing a location to a data provider and receiving a subset of the administrative levels for that location. Conventional approaches can also involve providing an administrative level to a data provider and receiving administrative levels that are higher in the location hierarchy than inputted administrative level. Conventional approaches can also involve providing an administrative level to a data provider and receiving a geolocation for the inputted administrative level.

But to get the administrative levels for a location together with other location-based data, conventional approaches perform a multi-step process in which the output of a first lookup (e.g., getting a first level administrative level for a location) is the input to a second lookup (e.g., getting the geo-coordinates of the first level administrative level). This process can involve analyzing and post-processing the output of the first step so that only what is needed is sent in the second step.

Embodiments herein solve this technological problem by abstracting away the conventional multi-step process to a single step and intelligently processing the location-based data between the internal steps of the multi-step process. This also reduces the need for interim location-based data.

Conventional approaches can involve getting administrative levels for a specific location from a data provider. But when an entity wants to get a particular type of location-based data, the entity may need to perform a post-processing function on a record-by-record basis which administrative level is associated with the particular type of location-based data. The entity may then have to request that particular type of location-based data from a data provider based on the identified administrative level.

In other words, the above multi-step process is just a first step to a second process that consumes the location-based data and generates the location-based data that is really important to the entity. This second process can involve the entity using an industry specific application, in-house script, or manual curating process to process the interim location-based data from the first step. Embodiments herein solve this technological problem by automatically performing this multi-step process internally.

Finally, conventional approaches are limited to providing location-based data that is available from a data provider such as HERE® or TomTom®. Embodiments herein solve this technological problem by opening the reference location data at a data provider to user-defined augmentation. For example, embodiments enable an entity to add custom content such custom location areas, points, or properties to the reference location data from the data provider. Moreover, because the embodiments process the custom location areas, points, and properties at an equal level as the reference location data, an entity can get back in response to a single request the location-based data that is really important to them.

FIG. 1 is a block diagram of a location system 100 for getting location-based data for a specific location or area, according to some embodiments. Location system 100 can include client device 102, location engine 106, and one or more data providers 108.

Client device 102 can be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof. Client device 102 can be operated by a business, organization, or other entity that is interested in getting location-based data for a specific location. For example, client device 102 can be operated by a business that wants to get delivery address information for a specific location associated with a customer.

Location engine 106 can receive a request for location-based data associated with a specific location from client device 102 over network 104. Network 104 can include, without limitation, wired and/or wireless intranet, extranet, Internet, cellular, Bluetooth and/or any other local, short range, ad hoc, regional, global communications network, as well as any combination thereof. Location engine 106 can receive the request and generate location-based data associated with the specific location using reference location data from a data provider 108. A data provider 108 can store location-based data (e.g., one or more location items of various component types) for various locations. A data provider 108 can store reference location data for a subset of countries, areas, or regions. Thus, location engine 106 may have to use another data provider 108 to get location-based data for other countries, areas, or regions.

A data provider 108 can store location-based data in a specific form. For example, the data provider 108 can store the reference location data in a location hierarchy. This location hierarchy may be specific to a particular country, area, or region. This location hierarchy may be also be vendor specific. For example, the data provider 108 may identity an administrative level in the U.S. at the county level as a district.

A data provider 108 can organize the reference location data in a vendor specific way. For example, a data provider 108 can store postal codes as part of its location hierarchy. A data provider 108 can also store additional location-based data associated with an administrative level (or location) that other data providers 108 do not return store. For example, a data provider 108 can store time zone data associated with an administrative level.

Client device 102 can send the requested location to location engine 106 in various formats. Client device 102 can send the requested location in the form of geo-coordinates (e.g., latitude and longitude coordinates). Client device 102 can send the requested location in the form of a delivery address. Client device 102 can send the requested location in the form of an area such as an administrative level name. Client device 102 can send the requested location in the form of a postal code. As would be appreciated by a person of ordinary skill in the art, client device 102 can send the requested location to location 106 in various other formats.

In some embodiments, location engine 106 can convert the requested location to a different format for sending to data provider 108. Location engine 106 can convert the requested location to a different format because different data providers 108 may accept different location formats.

For example, location engine 106 can convert a delivery address to a geo-coordinates if a data provider 108 does not accept a delivery address. Similarly, location engine 106 can convert an area to geo-coordinates if a data provider 108 does not accept an area.

Location engine 106 can provide an area name in different variations to a data provider 108. This is possible because a data provider 108 may store reference location data in different variations. For example, location engine 106 can provide an area name in different languages to a data provider 108. Location engine 106 can provide an area name in different scripts to a data provider 108. Location engine 106 can provide an alias for an area to a data provider 108.

Client device 102 can send additional criteria with the requested location to location engine 106. Client device 102 can send an administrative level of interest or location item of interest with the requested location. Location engine 106 can then return just the requested information (e.g., location-based data down to administrative level of interest or the specific location item of interest). For example, client device 102 can send a requested location together with a request for the corresponding postal code to location engine 106. Location engine 106 can then return just the postal code.

Regardless of the format of requested location or the particular location-based data requested, location engine 106 can perform, on behalf of client device 102, a multi-step process of requesting the location items associated with the requested location from one or more data providers 108 and combining the location items together into a single result set. Thus, location engine 106 enables client device 102 to send a single request to location engine 106 for location-based data of interest.

Figure 2:
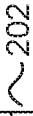
FIG. 2 is an example illustrating an result set produced by a process, according to some embodiments.

Location engine 106 can perform a bottom up process to produce the result set of interest for a requested location. FIG. 2 is an example of a result set 202 produced by this process, according to some embodiments.

Location engine 106 can first determine which data provider 108 to send the requested location. Location engine 106 can make this determination based on the cost of using the reference location data at a particular data provider 108, the type of location-based data stored at the data provider 108, and how detailed the reference location data is at the particular data provider 108. Location engine 106 can then send the requested location to the determined data provider 108 and request the lowest administrative level associated with the requested location. The lowest administrative level can depend on the location hierarchy being used by the data provider 108.

For example, in FIG. 2, location engine 106 can receive a request for location-based data associated with the geo-coordinates "34.094294/−118.318427." Location engine 106 can then request from a data provider 108 the lowest administrative level associated with the requested location. In response, the data provider 108 can return the location item "Hollywood" which is the lowest administrative level that the data provider 108 maintains about the requested location.

In some embodiments, a data provider 108 can also simultaneously provide additional location-based data associated with a location item such as its official level in the government administrative hierarchy, code, or geo-coordinates. Location engine 106 can combine this additional location-based data together with the received location item into a single combined location item (e.g., a row in FIG. 2.)

After receiving the lowest administrative level associated with the requested location, location engine 106 can map the received location item to a location component type. In some embodiments, location engine 106 can map the received location item to location component type at a particular level in a location hierarchy maintained by location engine 106. This location hierarchy can abstract away the specific hierarchy level names of the location hierarchy being used at the data provider 108. The location hierarchy maintained by location engine 106 can enable client device 102 to retrieve and process location items from location engine 106 independent of how they are identified in the location hierarchy at a particular data provider 108. The location hierarchy maintained by location engine 106 can further enables client device to retrieve and process location items from location engine 106 independent of how they are identified at each level for different locales.

Location engine 106 may define various location component types. Location engine 106 can map a location item from a data provider 108 to a location item of one of these location component types. This may involve location engine 106 combining data from multiple location items from a data provider 108 into a location item of one of these location component types.

A location item of a location component type may include a name, code, level, and geo-coordinates. In other words, a location item of a location component type may have these properties.

The name of a location item may identify an area. Location engine 106 can store variations of the name for a location item. For example, location engine 106 can store alternate names for the location item. Location engine 106 can also store the name in different scripts for the location item.

The code of a location item at a lower administrative level of a location hierarchy can be a value assigned by governing authorities of higher levels of the location hierarchy. For example, the code may be a assigned by the Geographic Names Information System (GNIS) in the U.S., the The National Institute of Statistics and Economic Studies (INSEE) in France, or the Kreisgemeindeschlussel in Germany. Location engine 106 may receive a code for a location item received from a data provider 108 in response to a requested location. In some embodiments, location engine 106 may request a code for a location item from a data provider 108 after receiving the location item from the data provider 108 in response to a requested location.

The geo-coordinates of a location item can be coordinates (e.g., latitude and longitude coordinates) for the location item. The geo-coordinates can be for the center of the location item. In some embodiments, the center of the location can be a point that is physically at the center of the location item. In some other embodiments, the center of the location item can be an administrative center of the location item. For example, the geo-coordinates for a location item representing the United States can be Washington, D.C. which is the capital of the United States.

Location engine 106 may define for various location component types their corresponding administrative levels in a location hierarchy. For example, location engine 106 may define the location component types country, region 1, region 2, locality 1, and locality 2. Location engine 106 may define these location component types in a location hierarchy starting with country at the highest administrative level and ending with locality 2 at the lowest administrative level.

Location engine 106 can map a location item received from a data provider 108 to a location item of a location component type in a location hierarchy maintained by location engine 106. Location engine 106 can perform this mapping based on a mapping specific to a locale of the requested location. Location engine 106 can also perform this mapping based on a mapping specific to the data provider 108.

For example, in FIG. 2, location engine 106 can map the location item "Hollywood" to the location component type "Locality 2" in a location hierarchy maintained by location engine 106. The location hierarchy maintained by location engine 106 can use internal names for the different location component types such as country, region 1, region 2, locality 1, and locality 2 to abstract away the locale specific names for the location component types. This can enable client device 102 to easily process the result set of location items from location engine 106 independent of which country or locale they are associated with.

Each level of a location hierarchy at a data provider 108 can be mapped to a corresponding level in the location hierarchy maintained by location engine 106. For example, country can be mapped to country, state can be mapped to region 1, county can be mapped to region 2, municipality can be mapped to locality 1, and neighborhood can be mapped to locality 2.

In some embodiments, to enable client device 102 to easily identify locale specific administrative level names, location engine 106 can maintain locally meaningful names in English for each level in the location hierarchy it maintains. For example, location engine 106 can maintain the administrative level names of country, state, county, municipality, and neighborhood for the internal administrative level names of country, region 1, region 2, locality 1, and locality 2. Location engine 106 can also maintain locally meaningful names in the local language (e.g., Spanish) for each level in the location hierarchy.

Location engine 106 can map a location item to a location component type that is independent of the location hierarchy. For example, location engine 106 can map a postal code location item to a location component type of "postal code."

Location engine 106 can get related location items associated with a received location item. For example, location engine 106 can request the geo-coordinates associated with a received location item. Location engine 106 can then send a request to a data provider 108 for the geo-coordinates associated with the received location item. For example, in FIG. 2, location engine 106 can request the geo-coordinates associated with the "Hollywood" location item. In response, location engine 106 can receive the geo-coordinates "34.09799/−118.32951" from the data provider 108. Location engine 106 can then merge the "Hollywood" location item together with the received geo-coordinates to create a complete location item of location component type locality 2.

Similarly, in FIG. 2, location engine 106 can request a code associated with a location item such as "California" by issuing a request to a data provider 108. In response, location engine 106 can merge the code "1779778" for California with the California location item to create a complete location item of location component type region 1.

In some embodiments, after receiving a first administrative level location item, location engine 106 can determine if there are higher administrative levels available in the location hierarchy at the data provider 108. In some embodiments, location engine 106 can determine this based on metadata received from the data provider 108. For example, the metadata may be simultaneously received from the data provider 108 with the first level location item. The metadata may indicate that there are higher administrative levels in the location hierarchy available.

In some embodiments, if location engine 106 determines there are higher administrative levels available, location engine 106 can send a request for the next administrative level above the location item to the data provider 108. In response, location engine 106 can receive the location item at the next administrative level from the data provider 108.

For example, in FIG. 2, location engine 106 determines there is a higher administrative level above the "Hollywood" location item at "Locality 2" at a data provider 108. Location engine 106 then submits a request for the next administrative level above the "Hollywood" location item to the data provider 108. Location engine 106 can send the request using the "Hollywood" location item or the geo-coordinates for the "Hollywood" location item. In response, location engine 106 receives the location item "Los Angeles" at the "Locality 1" administrative level.

Location engine 106 can repeat the above process of grabbing location items starting from the lowest administrative level and working its way to the top administrative level. For each level, location engine 106 can map the received location item to the corresponding location component type in the location hierarchy maintained by location engine 106.

Location engine 106 can stop repeating the process once the data provider 108 indicates there are no more higher administrative levels. In some other embodiments, location engine 106 can stop repeating the process based on criteria submitted with the requested location from client device 102. For example, location engine 106 may not repeat the process if the request from client device 102 is for just the postal code.

Location engine 106 can append additional location-based data to a location item. For example, location engine 106 can look up the geo-coordinates associated with a location item at a data provider 108. Location engine 106 can then add the geo-coordinates to the location item. This can involve combining the geo-coordinates together with the location item into a complete location item of a corresponding location component type.

Location engine 106 can also look up other location-based data such as a code associated with the location item. As would be appreciated by a person of ordinary skill in the art, the choice of what additional data to append to a location item can be user defined. The choice may also depend on what data is available at a data provider 108. Finally, whether location engine 106 performs a look up of the additional location-based data can depend on whether the additional location-based data is provided by default with the location item or must be separately queried at the data provider 108.

Location engine 106 can add additional location items to the result set based on their associated geolocation. For example, during processing of a location item (e.g., the lowest administrative level location item with geo-coordinates), location engine 106 can determine if there are additional location items near the geo-coordinates of the location item. Similarly, location engine 106 can determine if there are additional location items near the geo-coordinates of a requested location.

Location engine 106 can determine if there are additional location items within a threshold distance of the geo-coordinates of a location item or requested location. Location engine 106 can then return the additional location items within the threshold distance of the geo-coordinates. In some other embodiments, location engine 106 can return the closest location item to the geo-coordinates.

Location engine 106 can look up nearby location items based on a particular location component type provided by client device 102. Location engine 106 can then return nearby additional location items of the particular location component type.

Location engine 106 produces a result set based on the above process. This result set can include location-based data of interest to client device 102. The result set can combine location items from a data provider 108 into a ordered location hierarchy and merges related location items together into location item of various location component types.

Location engine 106 can perform the multi-step process of requesting one or more location items associated with the requested location from one or more data providers 108. Location engine 106 can then combine the resulting location items together into a single result set. This result set can then be provided to client device 102 in response its request. Thus, location engine 106 can enable client device 102 to issue a single request to location engine 106 for location items of interest.

However, often times an entity wants to extend reference location data stored at a data provider 108. The entity may want to also receive this extended location data as part of requesting location-based data about a location.

In some embodiments, location engine 106 can enable an entity of client device 102 to define its own location component types based on reference location data in a data provider 108. Location engine 106 can enable the entity add custom location areas, points, or properties to the reference location data in a data provider 108. Moreover, location engine 106 can process the custom location areas, points, or properties at an equal level as the reference location data. In this way, an entity can get back in response to a single request both the reference location data and associated custom location data that is important to them.

Location engine 106 can define a location component type representing a custom area. A location item of this custom location component type can be processed in the same way as other location items from reference location data. In other words, location engine 106 can selection location items at the administrative level of this custom location component type. Location engine 106 can also extend this custom component type with additional properties. Location engine 106 can also define another custom location component type representing another custom area based on the original custom location component type. In other words, the custom component type is handled the same way as any other location component type.

FIG. 3A is an example of how a custom location component type for an area can be defined, according to some embodiments. FIG. 3B is an example of how to integrate the custom location component type of FIG. 3A into a result set, according to some embodiments. FIG. 3C is example of a result set produced by location engine 106 based on the custom location component type defined in FIG. 3A, according to some embodiments.

An entity can define a custom location component type representing an area that is not specified in the reference location data from a data provider 108. This custom area can be based on business or organization considerations. An entity can then create instances (e.g., location items) based on the custom location component type.

When defining a custom location component type representing a custom area, the entity can give the custom location component type a name. The entity can also define the custom location component type's position in the location hierarchy maintained at location engine 106. This can enable location engine 106 to integrate location items of the custom location component type into a result set. In other words, this enables location engine 106 to place a location item of the custom location component type in the proper position of the result set (e.g., row of the result set). This can also enable location engine 106 to select location items down to the administrative level of custom location component type. This can also enable location engine 106 to locate and append other location items and properties to a location item of the custom location component type. For example, location engine 106 can use a location item of the custom location component to locate other nearby location items.

In some embodiments, to use a defined custom location component type, an entity can define location items based on the custom location component type. For example, in FIG. 3A, an entity can define a custom location component type called "Sales Region." The "Sales Region" custom location component may represent different regions where the entity sells products or services. This may be helpful for entities that want group states in the U.S. into different sales regions. This custom location component type can be represented by table 302 in FIG. 3A. Table 302 can be used to define location items of the custom location component type "Sales Region."

In FIG. 3A, the entity can define three sales region location items: 310, 312, and 314. These three location items represent "Western," "Central," and "Eastern" sales regions, respectively. For each location item, the entity can define the same properties that are part of other location component types used for reference location data. For example, the entity can define a name for the location item (e.g., Western Region), a short hand code (e.g., West), and geo-coordinates for the location item.

Location engine 106 can maintain additional properties about each location item. For example, location engine 106 can store an identifier that uniquely identities the location item among all location items at location engine 106. In other words, the unique identifier identifies the location item among other user defined location items or location items based on reference location data from a data provider 108. The unique identifier can be a globally unique identifier (GUID). In some other embodiments, the identifier can be unique identifier for a table (e.g., table 302 in FIG. 3A) that is globally unique when coupled a unique identifier associated with the table. For example, the identifier can be a primary key in a table. In FIG. 3A, location items 310, 312, and 314 have the GUIDs 301, 302, and 303.

After defining the location items of the custom location component type, the entity can define one or more location items that make up each defined location item. The location items that make up each defined location item can be location items based on reference location data or location items based on custom location component types.

The entity can select location items at lower administrative levels of the location hierarchy of location engine 106 to be a part of one of the defined location items. This may involve the entity requesting the location items at these lower administrative levels using location engine 106.

For example, the entity may want to define the "Western Region" to include location items representing the states of the western U.S. However, as would be appreciated by a person of ordinary skill in the art, an entity can also define a location item of a custom location component type to include location items at various levels of the location hierarchy at location engine 106. For example, the entity can define the "Western Region" to include state location items and municipality location items. This may be helpful in some cases. For example, in the case of the "Western Region," the entity may want to include some but not all of the municipalities in state of Nebraska in the "Western Region." In this case, the entity can include location items at the municipality level in the state of Nebraska for the "Western Region" location item.

In some embodiments, location engine 106 can assign what location items are contained or associated with another location item using a mapping table. For example, in FIG. 3B, location engine 106 can map the GUID associated with the "Western Region" location item to the GUIDs of location items that are at a lower administrative level in the location hierarchy than the sales region level.

In FIG. 3B, location engine 106 maps the "Western region" location item (e.g., GUID 301) to location items having GUIDs 401 and 402. In other words, the "Western Region" includes the location items 330 and 332. This can mean that location engine 106 returns the "Western Region" in the result set when an entity requests location items 330 or 332. As would be appreciated by a person of ordinary skill in the art, there are various other ways to assign existing location items to a location item of custom location component type.

After location engine 106 maps the lower administrative level location items to a location item of custom location component type, location engine 106 can return the location item of the custom location component type in response to a requested location by an entity. For example, in FIG. 3C, if an entity sends a request for a geolocation in Hollywood to location engine 106, and the location item for Hollywood (e.g., 330) is mapped to location item 301 representing the "Western Region," location engine 106 can return result set 306. Result set 306 can include the location item for the "Western Region." Moreover, the result set 306 can display the location item for the "Western Region" at the appropriate place the location item is positioned in the location hierarchy at location engine 106.

An entity can use location engine 106 to define a custom location component type representing a custom location. This is like defining a custom location component type representing a custom area. However, the entity may not define the placement of the custom location component type in the location hierarchy of location engine 106.

In some embodiments, a location item of the custom location component type can be processed in the same way as a location item of a location component type based on reference location data from a data provider 108. In other words, location engine 106 can select location items of this custom location component type. Location engine 106 can also extend the custom location component type with additional properties. Location engine 106 can also define another custom location component type based on the original custom location component type. In other words, the custom location component type is handled the same way as any other location component type.

FIG. 4A is an example of how a custom location component type for a location point can be defined, according to some embodiments. FIG. 4B is an example of a result set produced by location engine 106 based on the custom location component type defined in FIG. 4A, according to some embodiments.

In some embodiments, an entity can define a custom location component type representing a user defined location not specified in reference location data from a data provider 108. This custom location component type can be based on business or organization considerations. The entity can then create location items based on the custom location component type.

When defining a custom location component type representing a user defined location, the entity can give the custom location component type a name. For example, in FIG. 4A, the entity can define a custom location component type called "Airport" as represented by table 402.

To use the defined custom location component type, the entity may define location items based on the custom location component type. For example, in FIG. 4A, the entity can define a custom component type called "Airport" as represented by table 402. This custom location component type can be helpful for entities that want to integrate airport related data into the result set produced by location engine 106.

In FIG. 4A, the entity can define a location item 410. Location item 410 can represent Los Angeles International Airport. For each location item of the custom location component type, the entity can define the same properties present for location items from reference location data. For example, the entity can define a name for location item 410 (e.g., Los Angeles International Airport), a short hand code (e.g., LAX), and geo-coordinates for location item 410.

Location engine 106 can maintain additional properties about each location item. For example, location engine 106 can store an identifier that uniquely identities the location item among all location items at location engine 106. In other words, the unique identifier identifies the location item among other user defined location items or location items based on reference location data from a data provider 108. In some embodiments, the unique identifier can be a GUID. In some other embodiments, the identifier can be unique identifier for a table (e.g., table 402) which becomes globally unique when coupled with a unique identifier associated with the table. In other words, the identifier can be a primary key in a table. For example, in FIG. 4A, location items 410 can have the GUID 401.

Unlike a custom location component type representing an area, a custom location component type for a location point may not be explicitly assigned location items from administrative levels of the location hierarchy of location engine 106. In some embodiments, location engine 106 can determine what location items are associated with a location item of a custom location component type based on distance. Location engine 106 can determine what location items are associated with a location item of a custom location component type based on criteria other than distance.

When an entity sends a location to location engine 106, location engine 106 can perform a spatial search and return the closest location items of custom location component type to the requested location. In some other embodiments, location engine 106 can perform a spatial search and return multiple nearby location items of the custom location type.

Location engine 106 may return location items of the custom location component type that are within a threshold distance of the requested location. Location engine 106 may return at most a threshold number of nearby location items of the custom location component type for the requested location.

Location engine 106 can perform the spatial search based on various criteria. For example, location engine 106 can perform the spatial search based on physical distance, distance using different types of transportation (e.g., walking, public transportation, or car), and closest distance via major roads. As would be appreciated by a person of ordinary skill in the art, location engine 106 can perform the spatial search based on various other criteria.

Location engine 106 may return the location items of custom location component type based on whether the entity requested location items of the custom location component type. For example, location engine 106 may return location items of custom airport location point type if the user asked for airport related location information. In some other embodiments, location engine 106 may return location items of custom location component types in the result set based on predefined criteria.

After determining one or more location items of a custom location component type are associated with the requested location, location engine 106 can append the related location items to the result set produced for the requested location.

For example, in FIG. 4B, location engine 106 can determine that location item 410 is closest to a requested location in Hollywood. Location engine 106 can then append location item 410 to result set 404 generated in response to the requested location. This enables an entity to get additional relevant location items in a single request to location engine 106 without having to process the intermediary geolocation data.

Location engine 106 can define a custom property for different location component types whether custom component location types or location component types based on reference location data. This enables an entity to augment the reference location data from a data provider 108 with entity specific information.

A custom property can be associated with existing location items from the reference location data or added to location items of custom component location types. Location engine 106 can process a custom property in the same way that it processes a default property of a location item (e.g., name, geolocation, code, or level). As a result, location engine 106 can incorporate a custom property into the result set it produces in response to location submitted by an entity.

FIG. 5A is an example of how a custom property can be defined, according to some embodiments. As would be appreciated by a person of ordinary skill in the art, a custom property can be defined using various other techniques. FIG. 5B is example of a result set 504 produced by location engine 106 using the custom property defined in FIG. 5A, according to some embodiments.

In some embodiments, an entity can define a custom property representing a user defined property not specified in the reference location data from a data provider 108. The custom property can be based on business or organization considerations. The entity can use location engine 106 to extend existing location component types with the new custom property.

When defining a custom property, an entity can give the custom property a name. For example, in FIG. 5A, the entity can define a custom property called time zone as represented by table 502. The entity can also define criteria that controls the types of values that can be used for the custom property. For example, the entity can limit the types of values to on numeric range, numeric versus alphanumeric values, fixed list of values, or other constraints as would be appreciated by a person of ordinary skill in the art.

To use the defined custom property, an entity may create an instance of the property for a location item of a location component type. For example, in FIG. 5A, the entity can define a property value of "Pacific" for the custom property Time Zone for a location item 510. Location item 510 may be a location item representing the city of Los Angeles. The assignment of the custom property value to a location can be done using a property table (e.g., table 502). The property table can map a location item (e.g., Los Angeles) to a custom property value (e.g., "Pacific") by associating the GUID of the location item (e.g., 501) with the custom property value.

When an entity submits a location to location engine 106, location engine 106 can automatically map a retrieved location item to its corresponding property values using a property table (e.g., property table 502). Location engine 106 can then create a result set based on merging the retrieved location item with its corresponding property values. For example, in FIG. 5B, location engine 106 can create a result set 504 for a requested location in Hollywood that merges the location item of Los Angeles (location item 501) together with the property value "Pacific" In property table 502. This produces merged location item 520 in result set 504.

Figure 6:
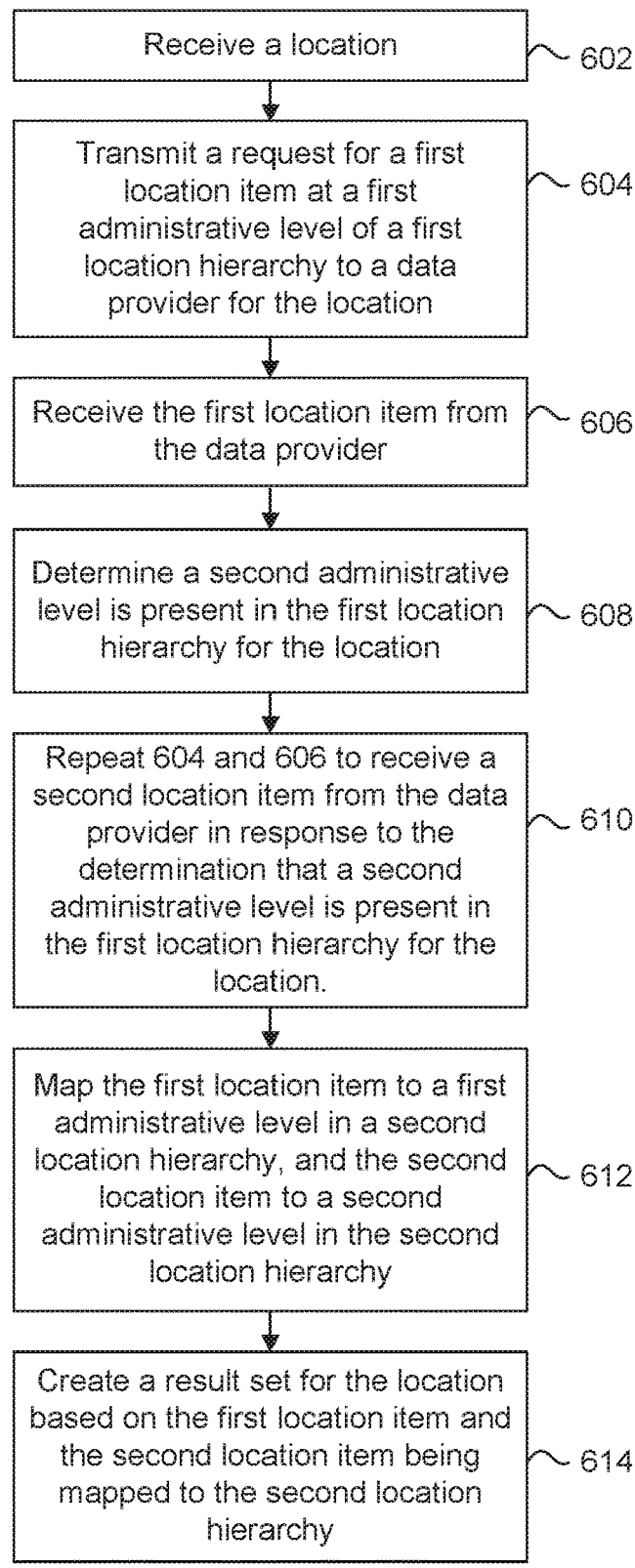
FIG. 6 is a flowchart for a method for obtaining location-based data for a specific location or area, according to some embodiments.

FIG. 6 is a flowchart for a method 600 for getting location-based data for a specific location or area, according to an embodiment. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 1. However, method 600 is not limited to that example embodiment.

In 602, location engine 106 receives a location. For example, location engine 106 can receive the location from client device 102. The location can be in the form of geo-coordinates (e.g., latitude and longitude coordinates), a delivery address, an area (e.g., an administrative level name), or other formats as would be appreciated by a person of ordinary skill in the art.

In 604, location engine 106 transmits a request for a first location item at a first administrative level of a first location hierarchy to a data provider 108 for the location. For example, can transmit a request for the lowest administrative level associated with the requested location to a data provider 108.

In 606, location engine 106 receives the first location item from the data provider 108 in response to the transmitting. The first location item (e.g., administrative level name) can contain additional location-based data such as its official level in a government administrative hierarchy, a code, or its geo-coordinates.

In 608, location engine 106 determines whether a second administrative level is present in the first location hierarchy for the location. For example, location engine 106 can determine whether there is a higher administrative level above the first administrative level in the first location hierarchy for the location.

In 610, location engine 106 optionally repeats 604 and 606 to receive a second location item from the data provider 108 in response to the determination that a second administrative level is present in the first location hierarchy for the location. Location engine 106 can repeat 604 and 606 as many times as required to get the necessary location items from the data provider 108 for the location.

In 612, location engine 106 maps the first location item to a first administrative level in a second location hierarchy. Location engine 106 can also optionally map any additional location items from 610 to their corresponding administrative levels in the second location hierarchy.

In 614, location engine 106 creates a result set for the location based on the first location, and optionally the second location item, being mapped to the second location hierarchy.

Figure 7:
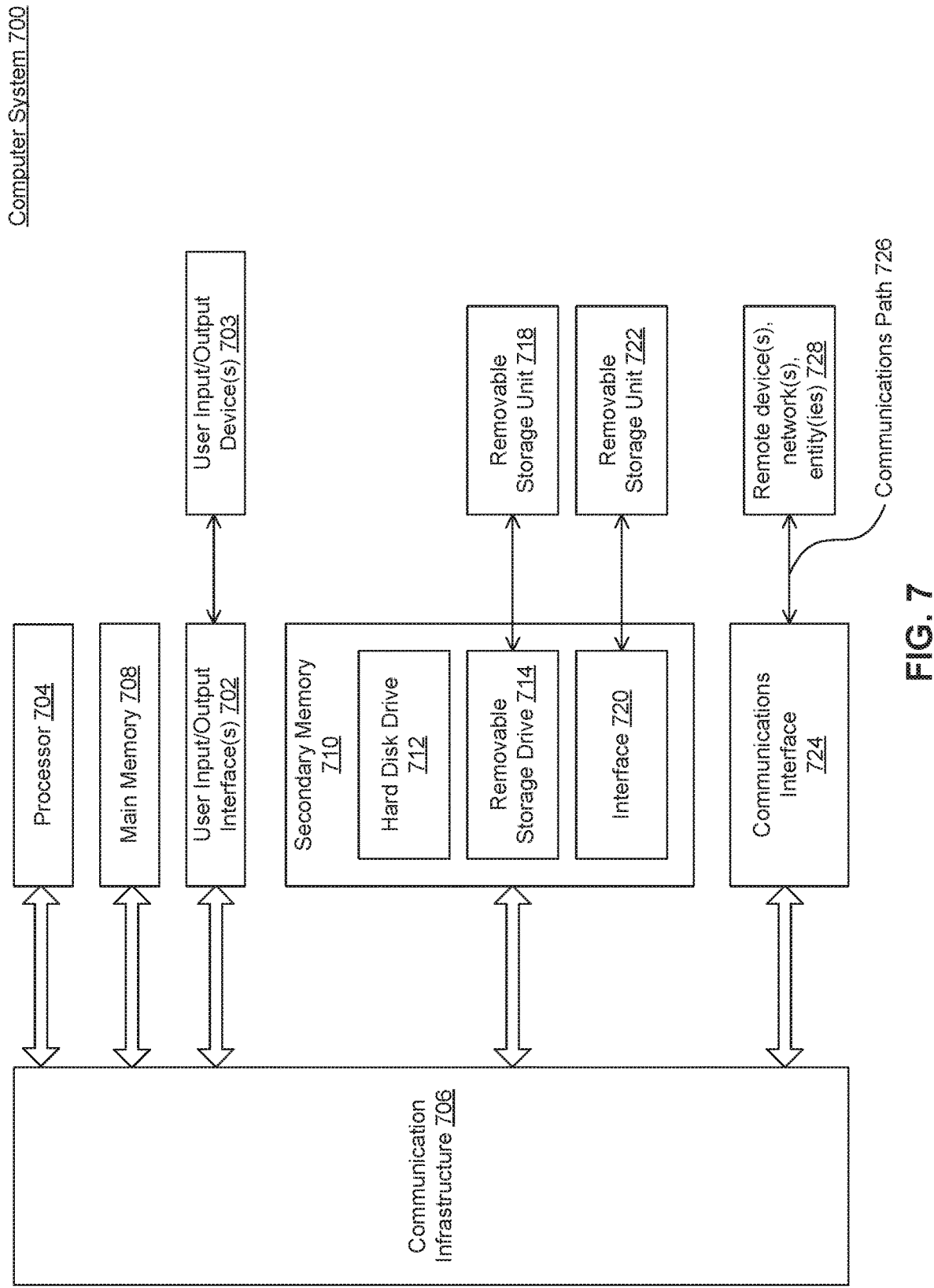
FIG. 7 is an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for getting related location data for a location, comprising:
   first receiving, by at least one processor, the location;
   first transmitting, by the at least one processor to a data provider, a request for a first location item at a lowest administrative level of a first location hierarchy, wherein the lowest administrative level is associated with the received location, and the first location hierarchy is utilized by the data provider;
   second receiving, by the at least one processor, the first location item from the data provider in response to the first transmitting;
   determining, by the at least one processor, that a first administrative level of the first location hierarchy is associated with the received location and is higher in the first location hierarchy than the lowest administrative level associated with the received location;
   second transmitting, by the at least one processor to the data provider, a second request for a second location item present at the first administrative level of the first location hierarchy based on the determining;
   third receiving, by the at least one processor, the second location item from the data provider in response to the second transmitting;
   mapping, by the at least one processor, the first location item to a first administrative level in a second location hierarchy and the second location item to a second administrative level in the second location hierarchy based on a mapping between the first location hierarchy and the second location hierarchy, wherein a name of the lowest administrative level of the first location hierarchy is different from a name of the first administrative level in the second location hierarchy; and
   creating, by the at least one processor, a result set for the location comprising the first location item and the second location item based on the first location item being mapped to the first administrative level in the second location hierarchy and the second location item being mapped to the second administrative level in the second location hierarchy.

2. The method of claim 1, further comprising:
   transmitting a request for a third location item to the data provider based on the first location item;
   receiving the third location item from the data provider; and
   merging the third location item into the first location item.

3. The method of claim 1, further comprising:
   transmitting a request for a third location item to the data provider based on the first location item;
   receiving the third location item from the data provider; and
   creating the result set based on the third location item.

4. The method of claim 1, further comprising:
   determining a third location item is closest to the first location item based on a geolocation associated with the third location item; and
   creating the result set based on the third location item.

5. The method of claim 1, further comprising:
   defining a third location item of a first component location type at a second administrative level within the second location hierarchy;
   selecting the first location item at the first administrative level within the second location hierarchy, wherein the first administrative level of the second location hierarchy is within the second administrative level of the second location hierarchy;
   mapping the first location item to the third location item;
   determining the location is within the third location item; and
   creating the result set based on the third location item.

6. The method of claim 1, further comprising:
   defining a third location item of a first component location type;
   assigning a geolocation to the third location item;
   determining the first location item is closest to the third location item based on the geolocation assigned to the third location item; and
   creating the result set based on the third location item.

7. The method of claim 1, further comprising:
   defining a property;
   mapping the property to the first location item; and
   creating the result set based on the property being mapped to the first location item.

8. The method of claim 1, wherein the location is geo-coordinates, a delivery address, or an area.

9. A system, comprising:
   a memory; and at least one processor coupled to the memory and configured to:
  first receive a location;
  first transmit a request for a first location item at a lowest administrative level of a first location hierarchy to a data provider, wherein the lowest administrative level is associated with the received location, and the first location hierarchy is utilized by the data provider;
  second receive the first location item from the data provider in response to the first transmitting;
  determine that a first administrative level of the first location hierarchy is associated with the received location and is higher in the first location hierarchy than the lowest administrative level associated with the received location;
  second transmit a second request for a second location item present at the first administrative level of the first location hierarchy to the data provider based on the determining;
  third receive the second location item from the data provider in response to the second transmitting;
  map the first location item to a first administrative level in a second location hierarchy and the second location item to a second administrative level in the second location hierarchy based on a mapping between the first location hierarchy and the second location hierarchy, wherein a name of the lowest administrative level of the first location hierarchy is different from a name of the first administrative level in the second location hierarchy; and
  create a result set for the location comprising the first location item and the second location item based on the first location item being mapped to the first administrative level in the second location hierarchy and the second location item being mapped to the second administrative level in the second location hierarchy.

10. The system of claim 9, wherein the at least one processor is further configured to:
  transmit a request for a third location item to the data provider based on the first location item;
  receive the third location item from the data provider; and
  merge the third location item into the first location item.

11. The system of claim 9, wherein the at least one processor is further configured to:
  transmit a request for a third location item to the data provider based on the first location item;
  receive the third location item from the data provider; and
  create the result set based on the third location item.

12. The system of claim 9, wherein the at least one processor is further configured to:
  determine a third location item is closest to the first location item based on a geolocation associated with the third location item; and
  create the result set based on the third location item.

13. The system of claim 9, wherein the at least one processor is further configured to:
  define a third location item of a first component location type at a second administrative level within the second location hierarchy;
  select the first location item at the first administrative level within the second location hierarchy, wherein the first administrative level of the second location hierarchy is within the second administrative level of the second location hierarchy;
  map the first location item to the third location item;
  determine the location is within the third location item; and
  create the result set based on the third location item.

14. The system of claim 9, wherein the at least one processor is further configured to:
  define a third location item of a first component location type;
  assign a geolocation to the third location item;
  determine the first location item is closest to the third location item based on the geolocation assigned to the third location item; and
  create the result set based on the third location item.

15. The system of claim 9, wherein the at least one processor is further configured to:
  define a property;
  map the property to the first location item; and
  create the result set based on the property being mapped to the first location item.

16. A non-transitory computer-readable medium having instructions stored thereon that, when executed by at least one computing device, cause the at least one computing device to perform operations comprising:
  first receiving a location;
  first transmitting a request for a first location item at a lowest administrative level of a first location hierarchy to a data provider, wherein the lowest administrative level is associated with the received location, and the first location hierarchy is utilized by the data provider;
  second receiving the first location item from the data provider in response to the first transmitting;
  determining that a first administrative level of the first location hierarchy is associated with the received location and is higher in the first location hierarchy than the lowest administrative level associated with the received location;
  second transmitting a second request for a second location item present at the first administrative level of the first location hierarchy to the data provider based on the determining;
  third receiving the second location item from the data provider in response to the second transmitting;
  mapping the first location item to a first administrative level in a second location hierarchy and the second location item to a second administrative level in the second location hierarchy based on a mapping between the first location hierarchy and the second location hierarchy, wherein a name of the lowest administrative level of the first location hierarchy is different from a name of the first administrative level in the second location hierarchy; and
  creating a result set for the location comprising the first location item and the second location item based on the first location item being mapped to the first administrative level in the second location hierarchy and the second location item being mapped to the second administrative level in the second location hierarchy.

17. The non-transitory computer-readable medium of claim 16, the operations further comprising:
  transmitting a request for a third location item to the data provider based on the first location item;
  receiving the third location item from the data provider; and
  merging the third location item into the first location item.

18. The non-transitory computer-readable medium of claim 16, the operations further comprising:
  transmitting a request for a third location item to the data provider based on the first location item;

receiving the third location item from the data provider; and creating the result set based on the third location item.

19. The non-transitory computer-readable medium of claim 16, the operations further comprising:
determining a third location item is closest to the first location item based on a geolocation associated with the third location item; and
creating the result set based on the third location item.

20. The non-transitory computer-readable medium of claim 16, the operations further comprising:
defining a third location item of a first component location type at a second administrative level within the second location hierarchy;
selecting the first location item at the first administrative level within the second location hierarchy, wherein the first administrative level of the second location hierarchy is within the second administrative level of the second location hierarchy;
mapping the first location item to the third location item;
determining the location is within the third location item; and
creating the result set based on the third location item.

21. The non-transitory computer-readable medium of claim 16, the operations further comprising:
defining a third location item of a first component location type;
assigning a geolocation to the third location item;
determining the first location item is closest to the third location item based on the geolocation assigned to the third location item; and
creating the result set based on the third location item.

* * * * *